(12) United States Patent
Perez et al.

(10) Patent No.: US 6,457,788 B1
(45) Date of Patent: Oct. 1, 2002

(54) COMPUTER HOOD LATCHING SYSTEM

(75) Inventors: Juan J. Perez, Tomball; Donal J. Hall, Magnolia; Jeff A. Lambert, Cypress, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 8 days.

(21) Appl. No.: 09/679,089

(22) Filed: Oct. 4, 2000

(51) Int. Cl.$^7$ ................................................ A47G 29/00
(52) U.S. Cl. ................................ 312/265.5; 312/223.2; 297/80
(58) Field of Search ........................... 312/223.1, 223.2, 312/263, 265.5; 361/724, 725, 726, 732, 683; 292/80, 81, 87

(56) References Cited

U.S. PATENT DOCUMENTS

| | | | | |
|---|---|---|---|---|
| 5,348,356 A | * | 9/1994 | Moulton | 292/80 |
| 5,593,219 A | * | 1/1997 | Ho | 312/223.1 X |
| 5,593,220 A | * | 1/1997 | Seid et al. | 312/223.2 X |
| 5,743,606 A | * | 4/1998 | Scholder | 312/223.2 |
| 5,785,398 A | * | 7/1998 | Park | 312/223.2 |
| 5,825,626 A | * | 10/1998 | Hulick et al. | 312/223.2 X |
| 5,967,633 A | * | 10/1999 | Jung | 312/223.2 |
| 5,992,955 A | * | 11/1999 | Yang | 312/223.2 X |
| 5,995,363 A | * | 11/1999 | Wu | 312/223.2 X |
| 6,074,028 A | * | 6/2000 | Ho | 312/223.2 |
| 6,109,710 A | * | 8/2000 | Wu et al. | 312/223.2 |
| 6,134,116 A | * | 10/2000 | Hoss et al. | 361/726 X |
| 6,231,140 B1 | * | 5/2001 | Chen | 312/223.2 |

FOREIGN PATENT DOCUMENTS

| | | | | |
|---|---|---|---|---|
| FR | 1384767 | * | 11/1964 | 292/128 |
| JP | 04290496 | * | 10/1992 | 361/726 |
| JP | 5257569 | * | 10/1993 | 361/726 |

* cited by examiner

Primary Examiner—Lanna Mai
Assistant Examiner—Hanh V. Tran
(74) Attorney, Agent, or Firm—Fletcher, Yoder & Van Someren

(57) ABSTRACT

A protective assembly for housing and accessing components is featured. The protective assembly has a chassis, a cover, and a flexible latch for securing the cover to the chassis. The flexible latch has a latch and the base has a catch. The base includes a fulcrum. The fulcrum is used during removal of the cover to pivot the latch so that the latch is brought free of the catch.

29 Claims, 4 Drawing Sheets

FIG. 4
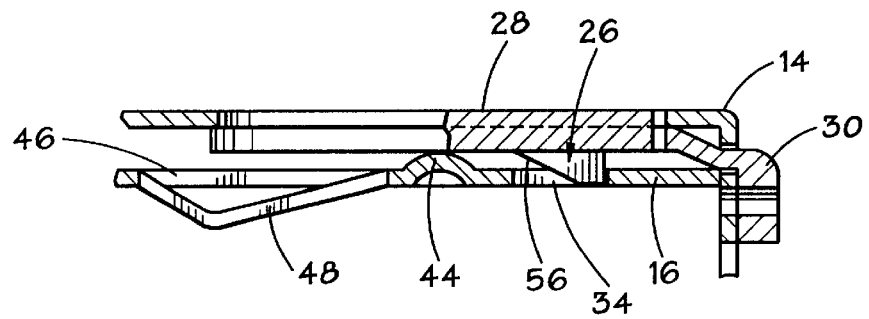
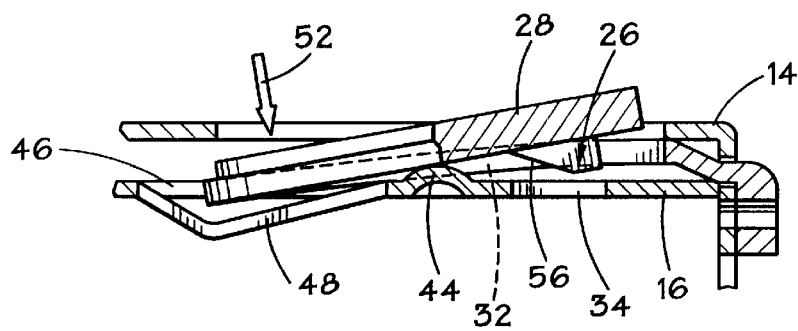
FIG. 8
FIG. 9
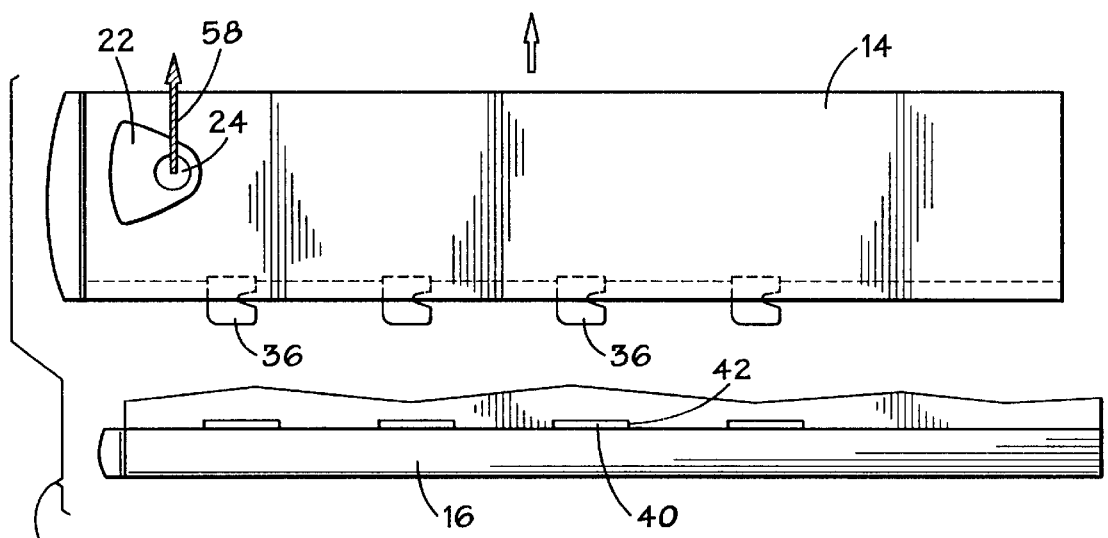

COMPUTER HOOD LATCHING SYSTEM

FIELD OF THE INVENTION

The present invention relates generally to a protective enclosure, and particularly to a system for accessing components housed within a protective enclosure.

BACKGROUND OF THE INVENTION

Many electrical devices are composed of electronic components housed within a protective enclosure. For example, the central unit of a desktop computer system typically consists of a microprocessor, hard drive, RAM, and power supply housed within a protective enclosure. The central unit is typically coupled to a monitor, keyboard, printer, and mouse.

Protective enclosures for housing electronic components come in a variety of shapes and sizes; however, they typically consist of a chassis with a removable cover. A chassis is typically composed of sheet metal. Covers may be formed of sheet metal and/or plastic. A cover is typically secured to a chassis by screws. Occasionally, the components within the protective enclosure need to be accessed, either for repair or upgrade. To remove the cover and access the components, any screws used to secure the cover to the chassis must be removed. A tool, such as a screwdriver or drill, is needed to remove the screws from the enclosure. Installing and removing screws, however, is a time consuming task. Additionally, screws are an additional component that must be accounted for and which can be easily lost.

Therefore, it would be advantageous to have a system that could allow access to the interior of a protective enclosure quickly, without the use of tools and producing no loose parts.

SUMMARY OF THE INVENTION

A protective assembly for housing an electronic component is featured. The protective assembly includes a chassis and a cover. The chassis has a catch and a fulcrum. A securing latch is secured to the cover. The securing latch includes a central body having a latch configured for engagement by the catch. The central body is disengaged from the catch by using the fulcrum to pivot the central body.

According to another aspect of the present invention, a latch system is featured. The latch system includes a pivotable latch, a catch, and a fulcrum. The catch is disposed to engage the pivotable latch. The pivotable latch may be pivoted about the fulcrum to disengage the catch.

According to another aspect of the present invention, a method for securing a cover to a chassis is featured. The method includes attaching a pivotable latch to the cover. The method also includes positioning a catch chassis such that the movement of the pivotable latch is restricted when the cover is in a over securing position. The method includes configuring the base with a fulcrum disposed in relation to the rigid body so that a force applied transversely to the rigid portion will cause the rigid portion of the pivotable latch to pivot from the cover securing position.

According to another aspect of the present invention, a latch to secure a cover to a chassis is featured. The latch has a mounting portion, a central body, and a flexible arm. The mounting portion secures the latch to a cover. The central body has a first member configured for capture by the catch. The flexible arm couples the central body to the mounting portion and biases the central body to a first position.

BRIEF DESCRIPTION OF THE DRAWINGS

The invention will hereafter be described with reference to the accompanying drawings, wherein like reference numerals denote like elements, and:

FIG. 4 is a cross-sectional view taken generally along line 4—4 of FIG. 2;

FIG. 8 is a cross-sectional view along line 4—4 of FIG. 2 illustrating the application of a pivoting force to the central body of the latch; and FIG. 9 is a side view of a protective enclosure with the removable cover removed from the chassis, according to a preferred embodiment of the present invention.

DETAILED DESCRIPTION OF THE PREFERRED EMBODIMENTS

Figure 1:
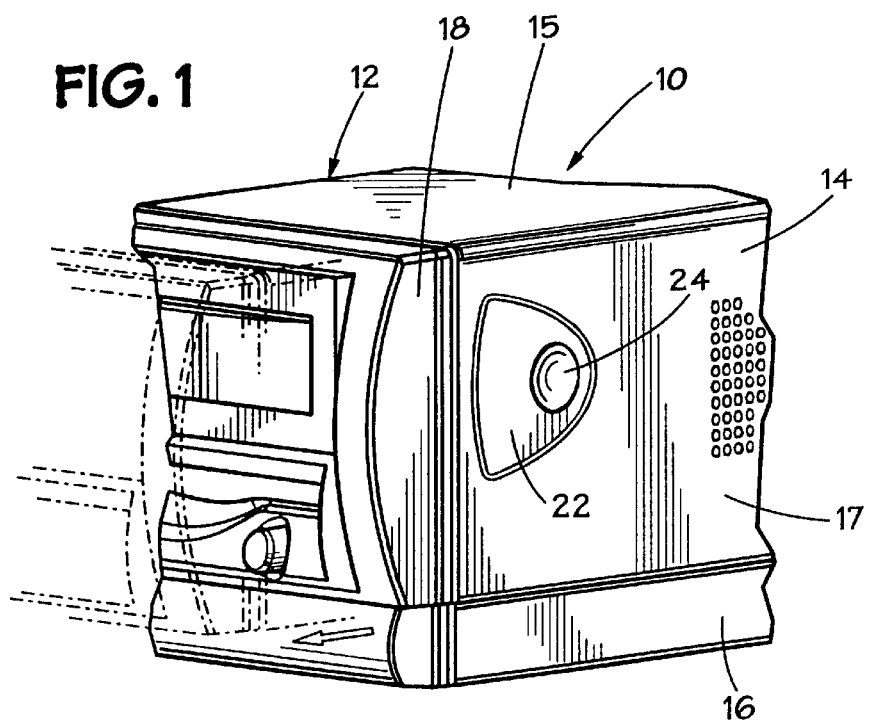
FIG. 1 is a perspective view of a protective enclosure having a removable cover and a chassis, according to a preferred embodiment of the present invention.

Referring generally to FIG. 1, an electronic system 10, e.g. a personal computer, having a protective enclosure 12 is illustrated. Protective enclosure 12 includes a removable cover 14, having a top portion 15, and a chassis 16. Cover 14 also includes a side portion 17. In the illustrated embodiment, an end piece 18 is secured to cover 14. End piece 18 can be a front bezel or back plate depending upon whether cover 14 is to be removed from the front or back of enclosure 12.

Cover 14 is secured to chassis 16 by two flexible latches 22 located on opposite sides of chassis 16. The flexible latches 22 allow cover 14 to be removed by hand from chassis 16 without the use of any tools and without producing any loose parts. Additionally, each latch 22 is formed with an indentation 24 that is configured to receive the tip of an operator's finger. Indentation 24 assists an operator apply the force needed to release latch 22 and remove cover 14 from chassis 16.

Figure 2:
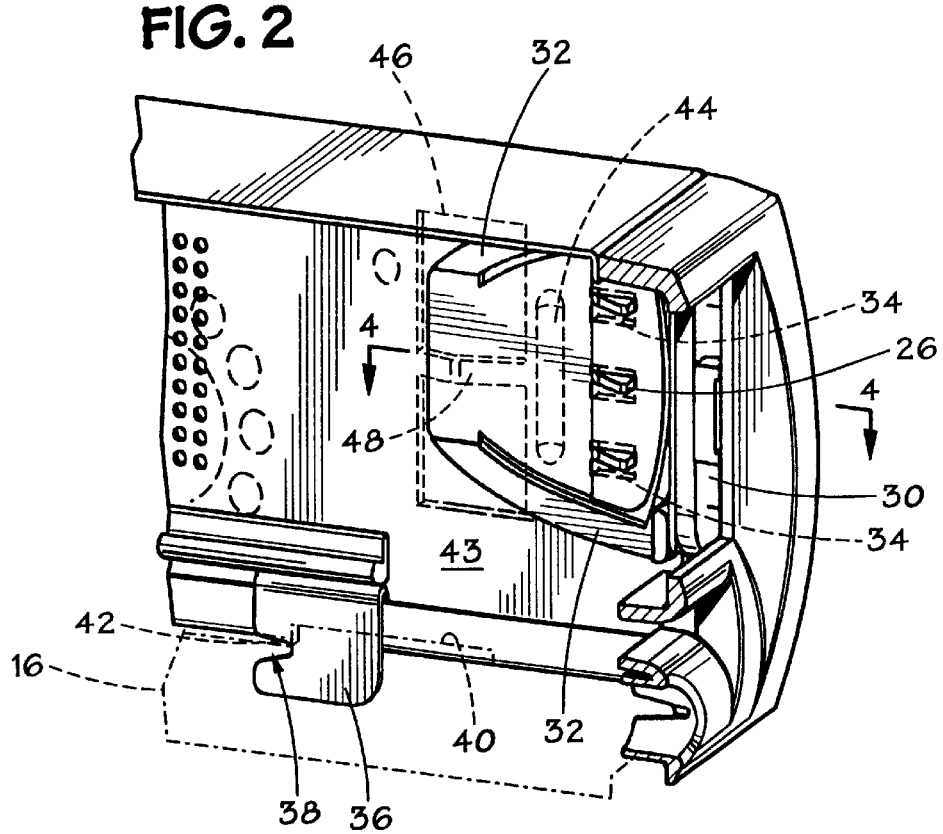
FIG. 2 is a perspective view of the interior of the protective enclosure of FIG. 1 with elements of the chassis shown in dashed lines.
Figure 3:
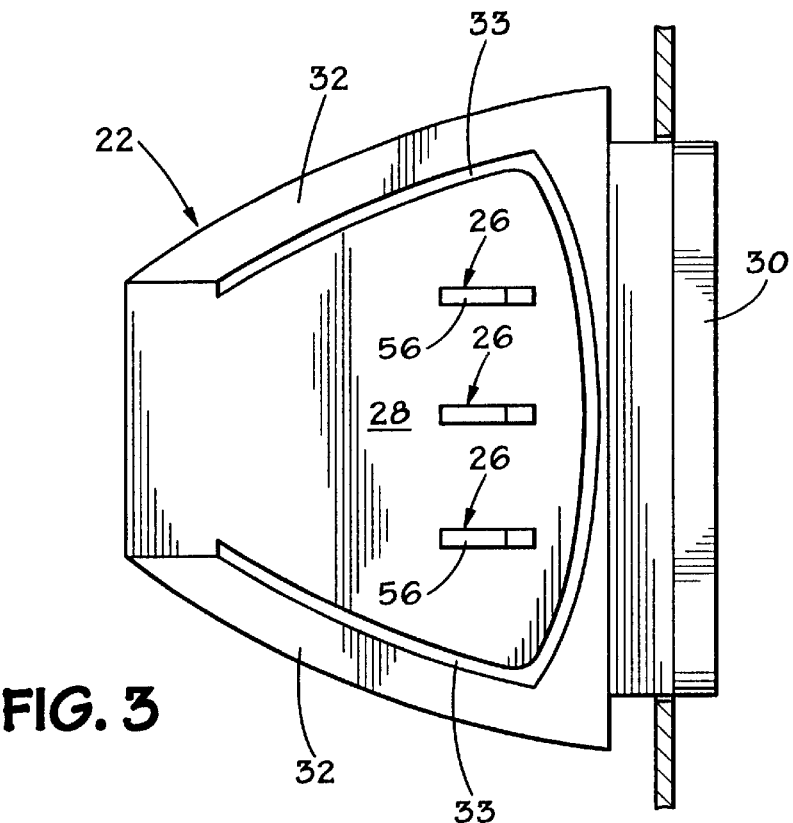
FIG. 3 side view of a flexible latch mounted to a cover, according to a preferred embodiment of the present invention.

Referring generally to FIG. 2, an interior view of protective enclosure 12 is illustrated. Latch 22 is secured to side portion 17 of cover 14. As best illustrated in FIG. 3, flexible latch 22 utilizes three ribs 26 disposed on a central body 28. However, more or less than three ribs can be used. Each flexible latch 22 has a mounting portion 30 for securing latch 22 to cover 14. Each latch 22 also includes two flexible arms 32 that secure central body 28 to mounting portion 30. Flexible arms 32 allow central body 28 to be flexibly secured to mounting portion 30. Flexible arms 32 also bias central body 28 to a normal position. Flexible arms 32 extend alongside control body 28 and connect to central body 28 at the end of latch 22 opposite mounting portion 30. A small gap 33 separates the central body 28 from mounting portion 30 and flexible arms 32.

In illustrated embodiment, each latch 22 is made of a single piece of molded plastic. However, latch 22 may also be formed of metal, or some other suitable material. Additionally, central body 28 is made more rigid than the two flexible arms 32. In the illustrated embodiment, the central body is made more rigid by molding central body 28 to have a greater thickness than arms 32.

Referring again to FIG. 2, the three ribs 26 of each latch 22 are inserted into three corresponding holes 34 in chassis 16 to secure cover 14 onto chassis 16. As best illustrated in FIG. 4 the holes 34 serve as a catch to restrict movement of the ribs 26, and thus cover 14. Alternatively, the ribs could be disposed on chassis 16 and and the holes disposed in latch 22.

Figure 5:
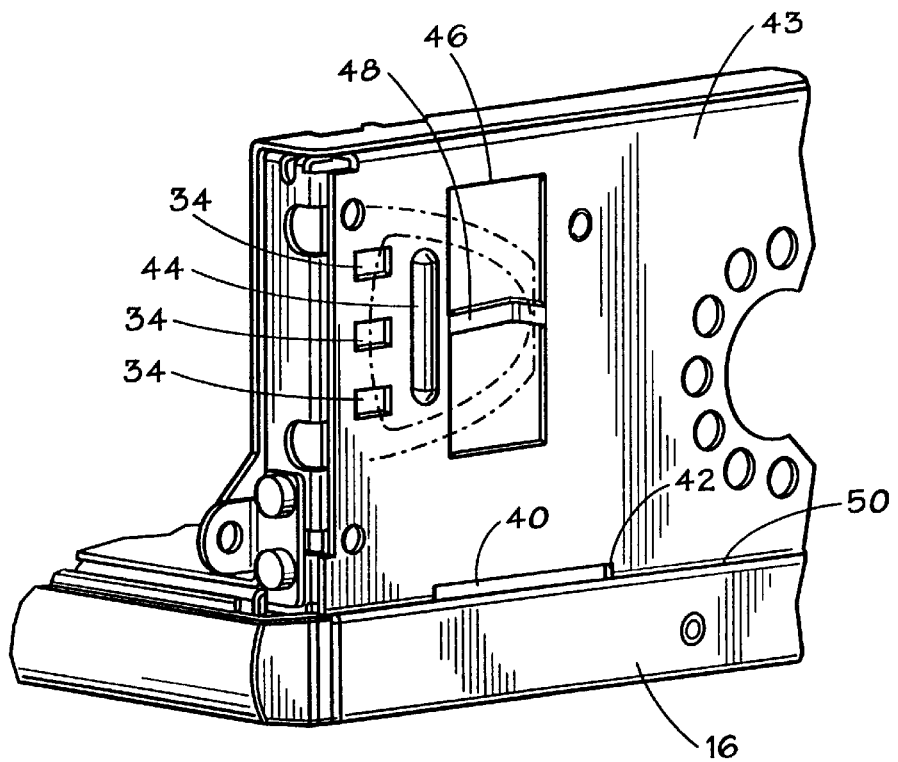
FIG. 5 is a perspective view of the chassis of FIG. 2 with portions of a flexible latch shown in dashed lines.

In the illustrated embodiment, each side 17 of cover 14 includes several tabs 36 having notched portions 38. As best illustrated in FIG. 5, for each tab 36 there is a corresponding slot 40 in chassis 16. Each slot 40 has an edge 42. The notched portion 38 of each tab 36 is abutted against edge 42 in each slot 40 when cover 14 is installed on chassis 16. The two latches 22 provide lateral guidance to cover 14 to maintain the tabs 36 abutted against chassis 16. The tabs 36 and latches 22 thus cooperate to prevent movement of cover 14 once the cover is placed on the chassis 16.

Referring generally to FIG. 5, chassis 16 has two side wall portions 43. Each side 43 includes a fulcrum 44, an opening 46, and an angled strip 48. Protective enclosure 12 is configured so that central body 28 of latch 22 is disposed over fulcrum 44 when cover 14 is installed on chassis 16.

Chassis 16 also includes a support ledge 50 extending along the length of chassis 16. Ledge 50 supports cover 14 and provides guidance during lateral movement of cover 14. Additionally, ledge 50 is configured so that chassis 16 and cover 14 produce a coplanar surface when cover 14 is installed on chassis 16.

Referring generally to FIGS. 6 through 9, the process by which cover 14 is removed from chassis 16 is illustrated. Prior to removal of cover 14, latch 22 maintains cover 14 oriented on chassis 16 so that the notches 38 of tabs 36 are abutted against the edges 42 of the slots 40. The tabs 36 and slots 40 prevent vertical movement of cover 14. The tabs 36 and slots 40 limit the lateral movement of cover 14 to the right, while the ribs 26 and holes 34 prevent lateral movement of cover 14 to the left.

Figure 6:
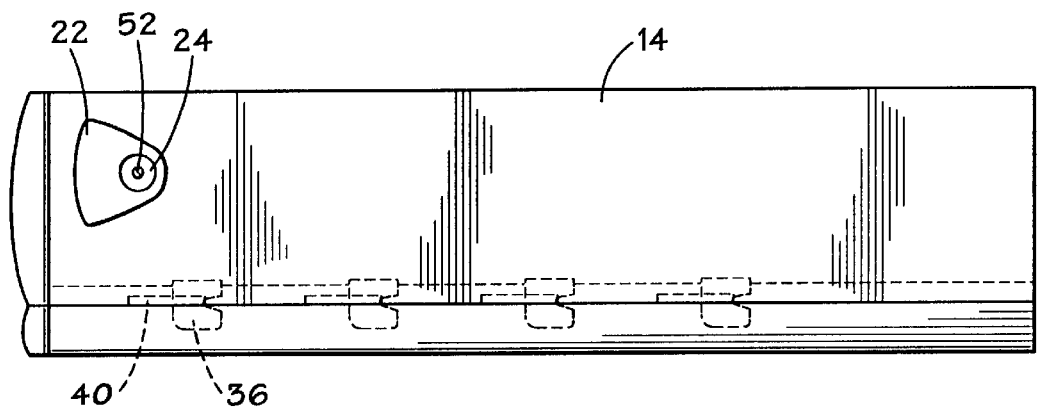
FIG. 6 is a side view of a protective enclosure with a removable cover secured to a chassis, according to a preferred embodiment of the present invention.

As best illustrated in FIGS. 6 and 8, the first step in removing cover 14 from chassis 16 is to apply a generally perpendicular force to indentation 24 of latch 22, as referenced by arrow 52. The application of force 52 to central body 28 causes central body 28 to pivot over fulcrum 44 withdrawing ribs 26 from holes 34. A portion of central body 28 is displaced through opening 46 in chassis 16. Angled strip 48 limits the insertion of central body 28 through opening 46. The pivoting of central body 28 from its normal position causes the flexible arms 32 to be bent. When force 52 is removed, flexible arms 32 return latch 22 to its normal position.

Figure 7:
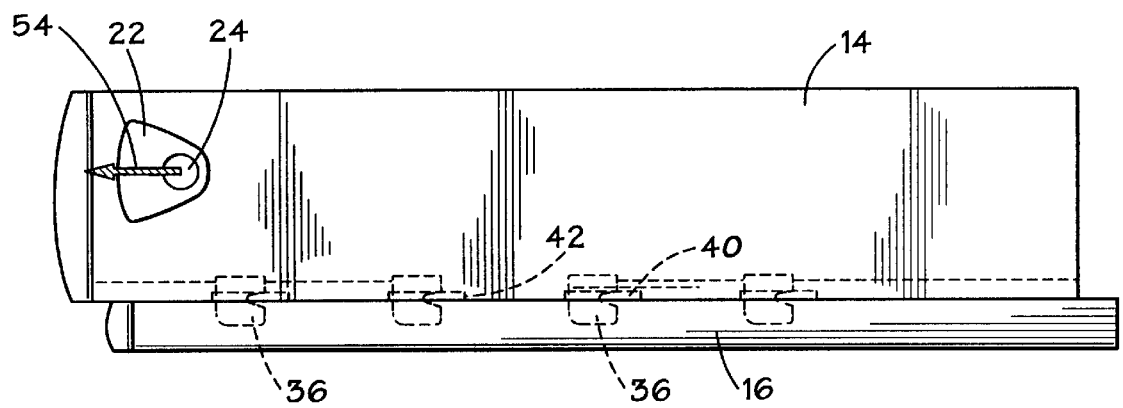
FIG. 7 is a side view of the protective enclosure of FIG. 5 with the removable cover displaced from its normal position on the chassis, according to a preferred embodiment of the present invention.

Referring generally to FIG. 7, once ribs 26 are free of holes 34, a lateral pulling force, as referenced by arrow 54, is applied at indentation 24 to free tabs 36 from slots 40. The lateral movement of cover 14 to the left frees the tabs 36 from the edges 42 of each slot 40. Once tabs 36 are free of edge 40, cover 14 can be removed from chassis 16 by applying a vertical force to cover 14, as referenced by arrow 58 in FIG. 9.

To install cover 14 to chassis 16, cover 14 is placed over chassis 16 so that tabs 36 are inserted through holes 40 in chassis 16. A lateral force, opposite in direction to force 54 is then applied to cover 14 to move cover 14 so that the notches 38 are directed against the edges 42 of each slot 40. The lateral movement also directs the ribs 26 into position for insertion into the holes 34. Each rib 26 has an angled leading edge 56 that makes it easier for latch 22 to be pushed over the surface of chassis 16 during installation.

It will be understood that the foregoing description is of preferred exemplary embodiments of this invention, and that the invention is not limited to the specific forms shown. For example, in the illustrated embodiment, tabs 36 are used in cooperation with flexible latch 22 to secure cover 14 to chassis 16. However, some other arrangement can be used to assist flexible latch 22 in securing cover 14 to chassis 16, such a pin-and-socket arrangement. Additionally, the number of ribs 16 and holes 34 is arbitrary, more or less may be used. These and other modifications may be made in the design and arrangement of the elements without departing from the scope of the invention as expressed in the appended claims.

What is claimed is:

1. A protective assembly for housing an electronic component, comprising:
   a chassis having a catch and a fulcrum;
   a cover; and
   a securing latch secured to the cover, the securing latch having:
   a central body configured for engagement by the catch, wherein the central body is disengaged from the catch by pivoting the central body about the fulcrum.

2. The assembly as recited in claim 1, comprising:
   a first member on the cover and a second member on the chassis, the first and second members being configured to restrict vertical movement of the cover when the cover is disposed in a first lateral position on the chassis.

3. The assembly as recited in claim 2, wherein the securing latch and catch cooperate to maintain the cover in the first lateral position.

4. The assembly as recited in claim 3, comprising a support guide to support the cover on the chassis and to guide the lateral movement of the cover.

5. The assembly as recited in claim 1, wherein the securing latch includes a protrusion configured for capture by the catch.

6. The assembly as recited in claim 5, wherein the protrusion is an angled rib extending from the central body.

7. The assembly as recited in claim 1, wherein the catch is defined by a hole in a side of the chassis.

8. The assembly as recited in claim 1, comprising an opening through a side of the chassis, wherein a portion of the central body is directed into the opening when the central body is pivoted from a normal position.

9. The assembly as recited in claim 8, comprising a restraint to limit the movement of the central body through the opening.

10. The assembly as recited in claim 1, wherein the securing latch includes a mounting portion for securing the securing latch to the cover.

11. The assembly as recited in claim 10, wherein the securing latch includes a flexible member that secures the central body to the mounting portion and biases the central body to a normal position.

12. The assembly as recited in claim 1, wherein the cover is removed from the chassis by pivoting the central body to disengage the latch from the catch, displacing the cover laterally from the first lateral position, and removing the cover vertically from the chassis.

13. A latch system for securing a cover housing to a chassis, comprising:
   a pivotable latch securable to the cover housing;
   a catch securable to the chassis and disposed to engage the pivotable latch; and
   a fulcrum securable to the chassis, wherein the pivotable latch is pivoted about the fulcrum to disengage the catch.

14. The latch system as recited in claim 13, wherein the catch is defined by a hole formed in a portion of the chassis.

15. The latch system as recited in claim 14, wherein the pivotable latch includes a rib configured for restraint by the hole formed in a portion of the chassis.

16. The latch system as recited in claim 15, wherein the rib is disposed on a rigid portion of the pivotable latch.

17. The latch system as recited in claim 16, wherein the pivotable latch includes a plurality of flexible arms to secure the rigid portion to a securing portion of the pivotable latch.

18. The latch system as recited in claim 13, wherein the chassis includes a support for the cover and a plurality of slots through the support, and further wherein the cover includes a plurality of tabs having notches, each tab configured for insertion through a respective slot.

19. The latch system as recited in claim 18, wherein the pivotable latch maintains the plurality of tabs abutted against the edges of the plurality of slots.

20. The latch system as recited in claim 13, wherein the fulcrum is disposed on a wall portion of the chassis.

21. The latch system as recited in claim 16, wherein the rib has an angled edge.

22. A method for securing a cover to a chassis, comprising the acts of:
   attaching a pivotable latch to a cover;
   positioning a catch on the chassis such that movement of the pivotable latch is restricted when the pivotable latch is in a cover securing position; and
   placing a fulcrum in a position relative to the pivotable latch so that a force applied transversely to the pivotable latch causes the pivotable latch to pivot from the cover securing position.

23. The method as recited in claim 22, further comprising the step of deploying a guide along the chassis to guide the lateral movement of the cover.

24. The method as recited in claim 22, further comprising the step of deploying a first member of the cover and a second member on the chassis to restrict vertical movement of the cover when the cover is in a first lateral position.

25. The method as recited in claim 24, wherein the cover is maintained in the first lateral position by the pivotable latch.

26. A latch to secure a cover to a chassis having a catch, comprising:
   a mounting portion for securing the latch to the cover;
   a central body, the central body having a first member configured for capture by the catch; and
   a flexible arm, the flexible arm coupling the central body to the mounting portion and biasing the central body to a first position wherein the flexible arm is connected to the central body at a first end of the central body and the mounting portion is positioned adjacent an end of the central body opposite the first end.

27. The latch as recited in claim 26, wherein the latch is formed of molded plastic.

28. The latch as recited in claim 27, wherein the central body is generally thicker than the flexible arm.

29. The latch as recited in claim 26, wherein the first member is an angled rib.

* * * * *